United States Patent

[11] 3,610,431

| [72] | Inventor | Horace E. Rodden<br>202 N. 4th St., Roscommon, Mich. 48653 |
|------|----------|------------------------------------------------------------|
| [21] | Appl. No. | 865,431 |
| [22] | Filed | Oct. 10, 1969 |
| [45] | Patented | Oct. 5, 1971 |

[54] TRAILER AND TRUCK RACK WITH HOLDDOWN DEVICE
2 Claims, 3 Drawing Figs.

[52] U.S. Cl.................................................. 211/176,
211/60, 280/414
[51] Int. Cl........................................................ A47f 5/10,
A47f 7/00
[50] Field of Search............................................ 211/176,
60, 60 SK, 1, 5, 124; 248/361, 244; 280/414;
296/23 B; 214/84, 505–506, 450, 381, 383, 380,
382

[56] References Cited
UNITED STATES PATENTS

| 2,026,312 | 12/1935 | Houts........................ | 211/60 X |
| 2,173,953 | 9/1939 | Schwisow..................... | 211/60 |
| 2,511,623 | 6/1950 | Darcangelo.................. | 214/381 |
| 2,851,235 | 9/1958 | Henig........................... | 214/84 X |
| 2,930,488 | 3/1960 | Best et al...................... | 211/176 |
| 3,154,026 | 10/1964 | Klasing........................ | 248/361 X |

*Primary Examiner*—Ramon S. Britts
*Attorney*—Adolph G. Martin

ABSTRACT: A load-carrying rack for trailers and trucks consisting of a pair of spaced upright posts, each having thereon vertically spaced pairs of oppositely disposed support arms. Slidable sleeves on the upright posts, one located above each pair of support arms, have thereon clamping arms vertically aligned with the support arms. The slidable sleeves on each post are held in fixed spaced relationship by connector bars. A pivoted operator lever on each of the upright posts is connected by pivoted means to one of the slidable sleeves on the post. The slidable sleeves on each post are thus movable in unison so that the clamping arms thereon will simultaneously engage and disengage any load resting on the support arms.

PATENTED OCT 5 1971

3,610,431

INVENTOR
HORACE E. RODDEN
BY Adolph G. Martin
ATTORNEY

3,610,431

TRAILER AND TRUCK RACK WITH HOLDDOWN DEVICE

BACKGROUND OF THE INVENTION

This invention relates to carrying racks generally, and more particularly to a rack for use on trailers and trucks to transport loads consisting of elongated members such as canoes. Loads of this type are customarily lashed to lateral supports provided on trailer racks. Thus, considerable time is required for loading and unloading operations, thereby increasing substantially the transportation costs on such items. Furthermore, such loads are characteristically unstable when handled in this manner, so that the possibilities of a load shift in transit, with resultant damage to cargo and equipment, is always present.

SUMMARY OF THE INVENTION

This invention consists of a trailer and truck rack comprising a wheeled chassis 10 having mounted thereon a pair of longitudinally spaced upright posts 14. Pairs of oppositely disposed lateral support arms 16 on the upright posts 14 have thereon load retainer members 17. Slidable sleeves 18 on the upright posts 14, one above each pair of support arms 16, are connected together by rigid bars 22. Two clamping arms 20 on each of the slidable sleeves 18 are disposed above the support arms 16 on the upright posts 14. A pivoted operator lever 32 on each upright post 14 is pivotally connected to one of the slidable sleeves 18 thereon by a bar 36. A resilient member 24, on the lower side of each clamping arm 20, secures the load seated on the support arms 16 of the upright posts 14.

CONSTRUCTION

Figure 1:
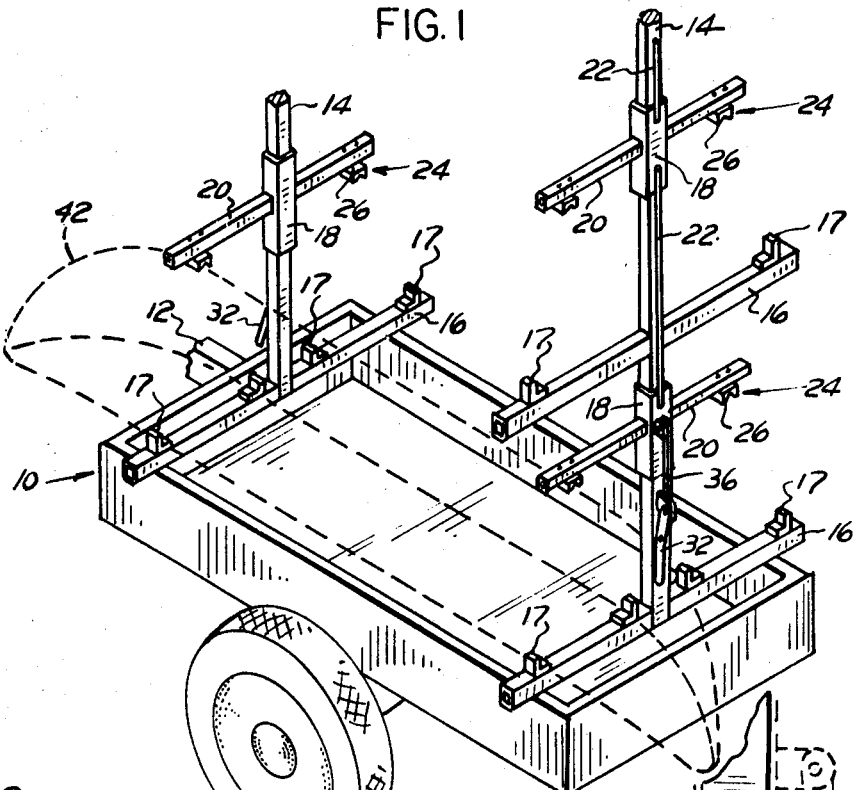
FIG. 1 is a perspective view of the trailer rack comprising the applicant's invention showing it mounted on a wheeled chassis 10.

For a more detailed description of the invention, reference is made to the drawings in which numeral 10 designates a wheeled chassis having a coupling member 12, partially shown in FIG. 1, for attachment in the customary manner to a tractor or other towing unit not here disclosed. A rack comprising two upright posts 14 of rectangular cross section, each having thereon vertically spaced pairs of oppositely disposed support arms 16, is mounted on the wheeled chassis 10.

Spaced load retainer members 17 are provided on the upper side of each support arm 16. A slidable sleeve 18, above each pair of support arms 16 on the upright posts 14, has thereon two clamping arms 20 disposed above the support arms 16. Rigid bars 22 connect the slidable sleeves 18 on each upright post 14 so as to hold them in a fixed spaced relationship. A resilient member 24, on the lower side of each clamping arm 20, is disposed midway between the retainer members 17 on the support arms 16.

The resilient members 24 each comprise a block 26 secured to the clamping arm 20 by bolts 28. A coil spring 30, around each of the bolts 28, is seated on the block 26 yieldably holding it in the full line position shown in Figure 3. An operator lever 32 is pivotally attached at the upper end to a support 34 on the lower portion of each upright post 14. A vertically disposed bar 36 is pivotally connected between the operator lever 32 and the lowest slidable sleeve 18 on the upright post 14.

In practice, the length and height of a carrying rack will be determined in part by the type of load and the size of trailer or truck with which it is to be used. Load stability and safety requirements, however, will ultimately dictate in each instance the maximum size of carrying rack which can be properly used on each trailer and truck.

The preceding discussion completes a description of the structural details relating to the applicant's invention herein disclosed. However, to facilitate a more thorough and comprehensive understanding of the subject matter, a discussion is immediately hereinafter directed to the manner in which the device operates to accomplish its intended function.

Figure 3:
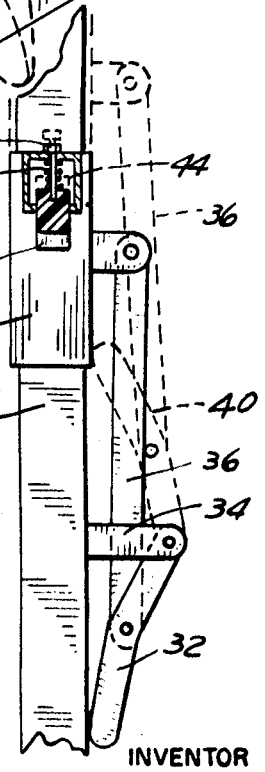
FIG. 3 is an enlarged section view, taken substantially on plane 3—3 in FIG. 2, showing structural details of the operator lever linkage and resilient blocks 24.

In use, the applicant's rack is mounted on a wheeled chassis 10, as shown in FIG. 1, and the operator levers 32, on each of the upright posts 14, are raised to the elevated position, shown by the broken lines 40 in FIG. 3. This movement of the operator lever 32 is transmitted through the bar 36 to the slidable sleeves 18 on each upright post 14 thereby raising them to the broken line position shown in FIG. 3.

Figure 2:
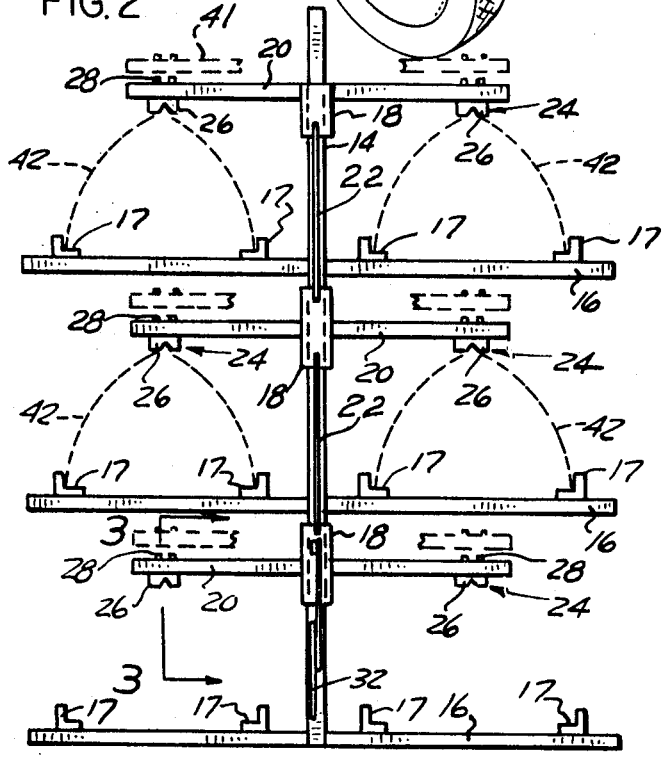
FIG. 2 is an end elevation view of the trailer rack, removed from the wheeled chassis 10, showing the clamping arms 20 in holding engagement with canoes 42 resting on the support arms 16.

The clamping arms 20 are accordingly elevated to the broken line position 41 shown in FIG. 2 so as to permit a load to be conveniently placed on the support arms 16. When the load consists of canoes 42, as shown by outline in FIGS. 1 and 2, they are seated on the retainer members 17. The operator lever 32 is then moved to the full line position shown in FIG. 3, thereby lowering the slidable sleeves 18 and clamping arms 20 to the full line positions shown in FIGS. 1 and 2.

The resilient members 24 on the clamping arms 20 thereupon make contact with the bottom of the canoes 42, thus yieldably holding them in engagement with the retainer members 17. The coil springs 30 of the resilient members 24 permit the blocks 26 to shift upwardly to the broken line position 44 shown in FIG. 3, to avoid damage to the canoes 42 when bumps and other severe road conditions are encountered during transportation.

Based upon the foregoing discussion, the applicant is of the opinion that his invention has fulfilled a long-felt need in the field of carrying racks, and that he has accordingly made a valuable contribution to the related art. However, while the invention was described with reference to the structural details of a single embodiment, it will be appreciated by those familiar with the art that the principles involved are susceptible of numerous other practical adaptations.

I therefore claim as new, and desire to secure by Letters Patent:

1. A carrying rack for trailers and trucks comprising a plurality of spaced upright posts, a pair of oppositely disposed lateral support arms on each of the upright posts, a slidable sleeve on each upright post, two clamping arms on each slidable sleeve disposed above the support arms, and operator means comprising a lever pivotally supported by the upright post, and a bar pivotally connecting the operator lever and the slidable sleeve for lowering the clamping arms on the slidable sleeve into a load-holding relationship with the support arms.

2. The carrying rack of claim 1 having in addition thereto spaced retainer members on the support arms for laterally confining the load thereon.